(12) United States Patent  
Mathieu et al.

(10) Patent No.: US 7,693,184 B2  
(45) Date of Patent: Apr. 6, 2010

(54) METHOD AND SYSTEM FOR DATA TRANSMISSION BETWEEN A LOCAL AREA NETWORK AND A MAIN NETWORK AUTHORIZING FORMAT ADAPTATION OF SAID DATA

(75) Inventors: Bertrand Mathieu, Pleumeur-Bodou (FR); Yannick Carlinet, Lannion (FR); Dominique Massaloux, Lannion (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 11/664,912

(22) PCT Filed: Aug. 22, 2005

(86) PCT No.: PCT/FR2005/002125

§ 371 (c)(1),
(2), (4) Date: Dec. 9, 2008

(87) PCT Pub. No.: WO2006/040423

PCT Pub. Date: Apr. 20, 2006

(65) Prior Publication Data

US 2009/0080417 A1    Mar. 26, 2009

(51) Int. Cl.
 *H04J 3/24* (2006.01)
(52) U.S. Cl. ................................ 370/474; 370/505
(58) Field of Classification Search ......... 370/352–358, 370/401, 402, 229, 230, 231, 389, 471, 470, 370/472, 473, 474, 505, 235
See application file for complete search history.

(56) References Cited

U.S. PATENT DOCUMENTS 7,460,476 B1 * 12/2008 Morris et al. ............ 370/230.1
2003/0154272 A1 * 8/2003 Dillon et al. ................ 709/223

FOREIGN PATENT DOCUMENTS

WO     WO 01/005099      1/2001
WO     WO 2005/112365    11/2005

OTHER PUBLICATIONS

Cai, H. et al., "A novel low-complexity packetization method for fine-granularity scalable (FGS) video streaming", Information, Communications and Signal Processing, 2003 and Fourth Pacific RIM: Conference on Multimedia, vol. 3, pp. 1375-1379, Dec. 2003.

(Continued)

*Primary Examiner*—Brenda Pham
(74) *Attorney, Agent, or Firm*—Cohen Pontani Lieberman & Pavane LLP

(57) ABSTRACT

A telecommunications system SYST including a local area network WLAN, a main network INTNW, and an intermediate element INTM through which data packets Dpo, Epi/Tepi must pass in transit between the local area network WLAN and the main network INTNW. The system evaluates a volume of calls supported by the local area network WLAN, and truncates data packets if said volume is above a predetermined threshold. In the event of an overload, the size of data packets in transit through the local area network is automatically reduced without recourse to systematic and discriminatory elimination of a particular type of data.

8 Claims, 1 Drawing Sheet

OTHER PUBLICATIONS

Figure 1:
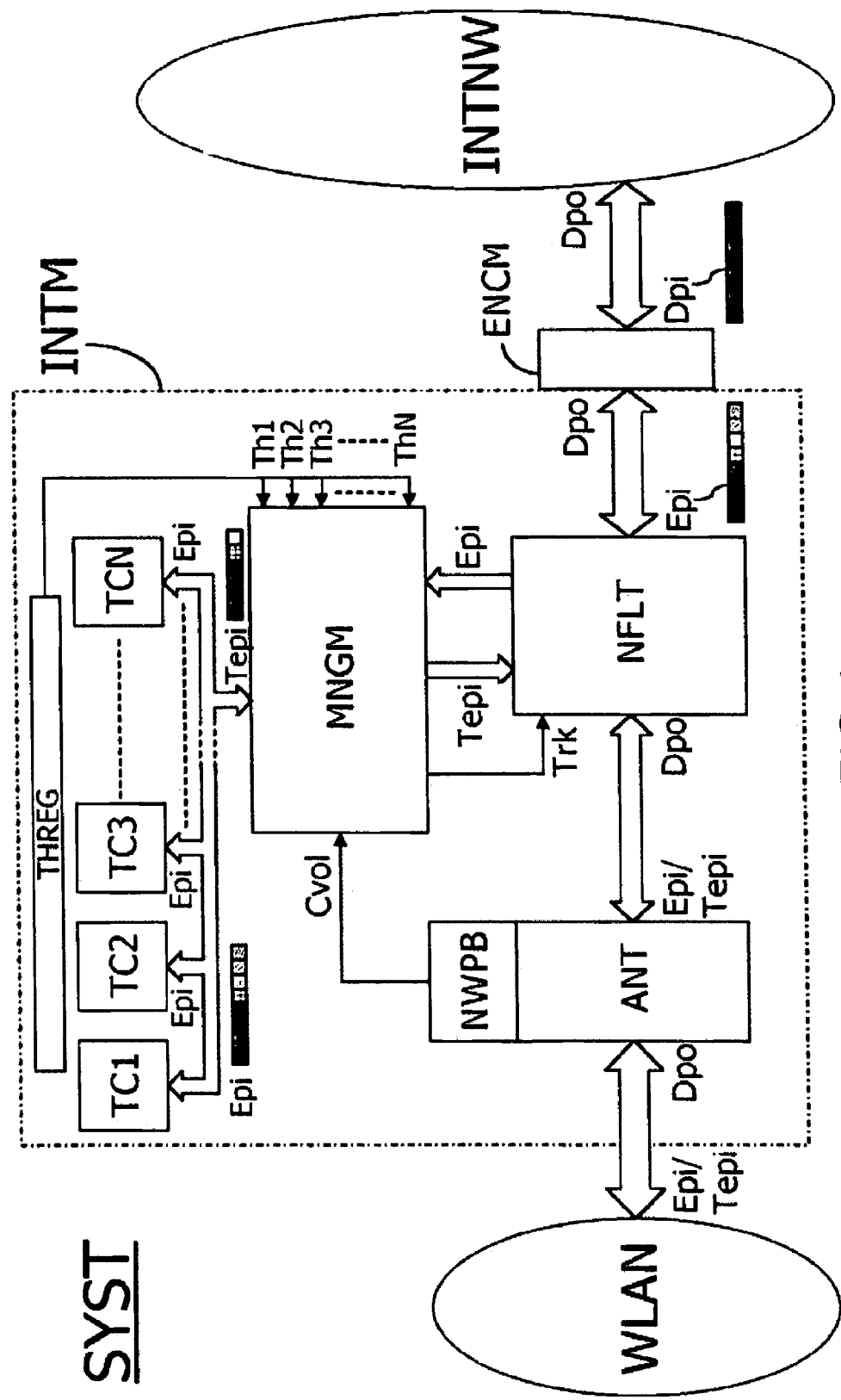

Chen, Y. et al., "Robust video streaming over wireless LAN with efficient scalable coding and prioritized adaptive transmission", Proceedings 2003 International Conference on Image Processing, IEEE, vol. 2 of 3, pp. 285-288, Sep. 14, 2003.

Kovesi, B. et al., "A scalable speech and audio coding scheme with continuous bitrate flexibility", Acoustics, Speech, and Signal Processing IEEE, vol. 1, pp. 273-276, May 17, 2004.

Tsarouchis, C. et al., "A Policy-Based Management Architecture for Active and Programmable Networks", IEEE Network, vol. 17, No. 3, pp. 22-28, May 2003.

Lei, Z. et al., "Rate adaptation transcoding for video streaming over wireless channels", Multimedia and Expo, IEEE, vol. 2, pp. 433-436, Jul. 2003.

\* cited by examiner

METHOD AND SYSTEM FOR DATA TRANSMISSION BETWEEN A LOCAL AREA NETWORK AND A MAIN NETWORK AUTHORIZING FORMAT ADAPTATION OF SAID DATA

RELATED APPLICATIONS

This is a U.S. National Phase Application under 35 USC 371 of International Application PCT/FR2005/002125 filed on Aug. 22, 2005.

FIELD OF THE INVENTION

The present invention relates to a method of transmitting data in a telecommunications system including a local area network adapted to communicate with a main network, for example an Internet-type meshed network, via an intermediate element through which data packets pass in transit from the local area network to the main network and vice-versa.

BACKGROUND OF THE INVENTION

Such methods are routinely used to enable local area network users to communicate with the Internet network. These local area networks may be made available to a particular population, for example, such as hotel guests or passengers at an airport, and may be produced using a data packet transmission technology compatible with an Internet-type protocol, whether that technology be a cable technology such as the PLT (power line telecommunication) technology, for example, or a wireless technology such as that known to the person skilled in the art as the Wi-Fi technology, defined by the IEEE 802.11 standard, for example. These local area networks are increasingly widespread, deployed and used, because they complement or offer an alternative to wireless networks belonging to telecommunications operators such as GSM (Global System for Mobile communication) networks, GPRS (General Packet Radio Service) networks, and UMTS (Universal Mobile Telecommunication System) networks. These local area networks are also very simple to install and to configure, have minimum utilization costs, and offer perfect integration with the Internet Protocol (IP). This protocol is a benchmark for all forms of telecommunication using the Internet.

The present invention is linked to the following considerations, which are the result of work carried out by the inventors.

A local area network such as those described above usually offers a bandwidth that is shared between all the users of the network, with the implication that the available bandwidth may vary considerably from moment to moment, as a function of the volume of calls in progress at the time concerned, which volume depends among other things on the number of terminals connected to said network and the nature of the applications being executed in said terminals, i.e. the nature of the data being transmitted by or to the terminals. The volume of calls generated by downloading is much greater than that generated by merely visiting an Internet site or by a voice-only call. Likewise, the volume of calls generated by viewing an audiovisual program such as a cinematographic work is much greater than that generated by merely reading an electronic mail message.

Accordingly, the inventors have realized that in the event of overloading of the local area network caused by connecting too many users or by a disproportionate consumption of bandwidth by certain applications, said local area network can offer users only a degraded quality of service, the degraded service usually resulting from losses of data packets that are reflected in missing elements in the information transmitted or received by the users of the local area network when it is overloaded.

SUMMARY OF THE INVENTION

An object of the invention is to minimize the impact of a local area network overload occurring under the conditions described above by proposing a transmission method which ensures that, even in the event of such an overload, the data packets that have to pass in transit through the local area network are routed to their destination, possibly in a form that is fragmented compared to their original form. The invention thus aims to authorize an adaptation of the call volumes exchanged between different networks used in a telecommunications system as described above, in a manner that destroys as little information as possible.

A transmission method conforming to the introductory paragraph is characterized in accordance with the invention in that it includes the following steps:
 a step of evaluating a volume of calls in progress in the local area network; and
 a step of truncating data packets in transit through the intermediate element to be executed if said volume is above a predetermined threshold.

The invention automatically reduces the size of the data packets that have to pass in transit through the local area network when an overload of said network has been detected by comparing the current volume of calls and the predetermined threshold, and does this without recourse to any systematic and discriminatory elimination of a particular type of data as a function of the nature of the application with which such data is associated, because in this situation any data packet in transit in the intermediate element could be truncated. This kind of non-elimination principle ensures a certain continuity of service to all users of the local area network, in contrast to what would be achieved if the choice were made to give preference to certain users or certain applications at the expense of other users, whose data would then purely and simply be ignored, with the result that the service relating to it would be interrupted, with the risk of causing intense dissatisfaction among these other users.

The service whose continuity is preserved in this way could have a quality of service lower than the quality of service usually achieved in the absence of an overload, but it should be noted that, if the method according to the invention is not used, data packets are inevitably lost in the event of an overload, thus causing total interruption of the service relating to certain users, with the result that any discontent produced among these users by merely truncating data relating to them would constitute a lesser evil. This is especially true in that not all users connected to the local area network are necessarily connected by means of a terminal able to make full use of all of the information content of a data packet. Thus although a PC (personal computer) type terminal is able to exploit fully a packet forming an audio frame, a PDA (personal digital assistant) type terminal could use only a portion of the packet, and a mobile telephone type terminal could use only an even smaller portion, with the result that truncating any such audio frame in accordance with the invention in the event of an overload might not even be noticed by users of PDA or mobile telephone type terminals, which confirms the relevance of the present invention.

The truncation step could be executed in various ways, but advantageously includes a hierarchical encoding sub-step during which the content of a data packet is encoded into the form of a primary data segment and a plurality of secondary data segments to be attached to the primary data segment.

The primary data segment preferably constitutes a coherent set that represents the original data packet, albeit imperfectly, and must be usable autonomously by any type of terminal intended to be used in the local area network. Accordingly, it is the minimum size of the packets intended for terminals able to process the smallest packets that in practice determines the format of the primary data segment.

The secondary data segments could have different sizes from one secondary segment to another, and could in theory be attached to the primary data segment in any order. In practice, however, it is preferable to attach them successively to the primary segment in a predetermined order of decreasing size.

Accordingly, successive secondary segments progressively improve the definition of the information conveyed by the re-assembled data packet, with the result that the larger the data packets that a terminal can process, the more coherent and significant the information that reaches the terminal after truncation. In fact, the data interpreted by the terminal then forms a continuous sequence in an order of increasing accuracy, whereas a random distribution of the secondary segments would risk leading to situations in which a terminal receives details conveyed by a first secondary data segment relating to an element defined in a second secondary data segment that the terminal in question has not yet received and may never receive. If no precautions are taken to prevent such situations occurring, the information conveyed by the first secondary data segment must be stored for subsequent use and there is the risk that it may even prove to be totally unusable, either of these hypotheses leading in practice to a quality of service that is less than the optimum.

In accordance with one of its hardware aspects, the present invention also provides a telecommunications system including a local area network adapted to communicate with an Internet-type meshed network via an intermediate element through which data packets pass in transit from the local area network to the meshed network and vice-versa, which system is characterized in that it includes:
  means for evaluating a volume of calls in progress in the local area network; and
  means for truncating data packets in transit through the intermediate element, which truncation means are adapted to be activated if said volume is above a predetermined threshold.

In accordance with one particular embodiment of such a telecommunications system, the truncation means advantageously include a plurality of truncation modules each adapted to be activated if the volume of calls is above a predetermined threshold associated with the truncation module concerned.

Each truncation module may be dedicated to a particular kind of information that can be conveyed by the data packets, for example purely audio data, audiovisual data or text data, each kind of information having its own sensitivity to possible overloads. Accordingly, depending on the kind of information to which the truncation module in question is dedicated, each truncation module may be adapted to apply a particular form of encoding adapted to the particular sensitivity of the information. Furthermore, different truncation modules may have been designed by different telecommunications operators, taking account of parameters specific to each of them with the aim of guaranteeing an optimum quality of service to their respective subscribers.

Finally, in a complementary mode of use of the particular embodiment described above, the intermediate element may be provided with a channel for submitting requests to a third party, such as one or more telecommunications operators and/or service providers, which request channel enables said intermediate element to request one or more of those operators to install one or more truncation modules in addition to those already integrated into the truncation means. Such a mode of use of the invention therefore enables dynamic deployment of truncation modules and thus confers on the truncation means a capacity to adapt to the call conditions applying in the telecommunications system.

BRIEF DESCRIPTION OF THE SINGLE DRAWING

The above and other features of the invention become more clearly apparent on reading the following description of an embodiment of the invention, said description being given with reference to FIG. 1, which is a functional block diagram showing the theory of operation of a telecommunications system SYST according to the invention.

DETAILED DESCRIPTION OF TILE SINGLE DRAWING

In this embodiment the system SYST includes a local area network WLAN adapted to communicate with a main network INTNW, for example an Internet-type meshed network, via an intermediate element INTM through which data packets Dpo and Dpi pass in transit from the local area network to the main network and vice-versa.

In the embodiment shown here, the local area network WLAN is a Wi-Fi-type wireless communications network compatible with the IEEE 802.11 standard, and the intermediate element INTM is therefore an access point provided with a send/receive antenna system ANT adapted to convert electromagnetic signals received from the local area network WLAN into signals suited to cable transmission within the Internet-type network INTNW, and vice-versa. In such an embodiment, the access point constituting the intermediate element INTM could also be adapted to implement domain name server functions of DHCP (Domain Host Control Protocol) type and thus supply IP addresses to its users. This access point may also be adapted to translate addresses with the object of masking addresses specific to certain users of the local area network WLAN, or even to serve as a firewall gateway to such users.

Alternatively, if the local area network WLAN uses cable technology, such as the PLT technology, for example, the intermediate element INTM is a gateway, which may also be provided with the functions described above.

The system SYST includes encoding means ENCM which here are attached to the intermediate element INTM and are adapted to transform input data packets Dpi into encoded packets Epi. Thus the encoding means ENCM are adapted to transform the content of a data packet Dpi into a primary data segment and a plurality of secondary data segments intended to be attached to the primary data segments, the secondary data segments preferably being attached successively to the primary segment in a predetermined order of decreasing size in order to form a hierarchical data packet Epi.

In the illustration thereof given here, an input data packet Dpi is represented graphically in the form of a black rectangle, signifying that the packet forms a coherent and indivisible whole. A data packet Epi encoded hierarchically after execution of a hierarchical encoding step is formed by a primary data segment represented in the form of a black rectangle less than half the size of the packet Dpi, which primary segment is followed by four secondary segments characterized by different filling modes. Although, in this embodiment, all the secondary segments are the same size, other encoding protocols may assign different sizes to different secondary segments.

In other embodiments of the invention, this kind of encoding step is not executed systematically but only if a local area network overload is detected. In such a configuration, which avoids placing an unnecessary load on considerable computation resources when no reformatting of the input packets is necessary, the encoding means are preferably integrated into the intermediate element itself. In contrast, if systematic encoding is chosen, the encoding means may be physically separate from the intermediate element INTM, and even included in the main network INTNW.

According to the invention, this system SYST includes:
means NWPB for evaluating a volume of calls in progress in the local area network WLAN; and
means (TC1, TC2, TC3, . . . , TCN) for truncating data packets Epi in transit through the intermediate element INTM, which truncation means include in this embodiment a plurality of truncation modules TC1, TC2, TC3, . . . , TCN, each truncation module Tci (for i=1 to N) being adapted to be activated if the volume of calls is above a predetermined threshold Thi associated with the truncation module Tci concerned.

As explained above, each truncation module TCi (for i=1 to N) may be dedicated to a particular kind of information that may be conveyed by the data packets Epi, for example, purely audio data, audiovisual data or text data, each kind of information having its own sensitivity to possible overloads. Thus each truncation module TCi (for i=1 to N) may be adapted to apply a particular truncation mode adapted to the particular sensitivity of the information depending on the kind of information to which the truncation model TCi concerned is dedicated. Different truncation modules may have been designed by different telecommunications operators, taking account of parameters specific to each of them, with the aim of guaranteeing an optimum quality of service to their respective subscribers.

In the embodiment of the invention described here, the predetermined threshold Thi associated with each truncation module TCi is stored in a threshold register THREG at the time of installing each of these modules in the intermediate element INTM. In an advantageous variant, the values of the predetermined thresholds Thi (for i=1 to N) may be modified by downloading from the Internet-type network INTW using a communications channel that is not shown here. Such a channel could further be used to enable dynamic deployment of one or more additional truncation modules, where appropriate in response to a request previously submitted by the intermediate element to a third party such as one or more telecommunications operators and/or service providers.

As explained above, the truncation means (TC1, TC2, TC3, . . . , TCN) provided in accordance with the invention are adapted to truncate the content of a hierarchical data packet Epi previously formatted in the form of a primary data segment to which are attached secondary data segments arranged in a predetermined order of decreasing size.

In the illustration thereof given here, a truncated hierarchical data packet Tepi obtained after execution of a truncation step is represented graphically in the form of a primary data segment represented in the form of a black rectangle less than half the size of an input data packet Dpi, which primary segment is now followed by only two secondary segments immediately adjacent said primary segment. The truncated packets Tepi therefore contain a smaller volume of data than the input packets Dpi, so that executing a systematic hierarchical truncation step such as that described above at least partially absorbs the overload that led to this situation.

The evaluation means NWPB here consist of a probe attached to the send/receive antenna system ANT and are therefore able to capture any frame passing through the intermediate element INTM. The evaluation means NWPB are adapted to generate an information signal Cvol having a value that conveys information representing the bandwidth occupied within the local area network at the time concerned, said information signal Cvol possibly also conveying information relating to one or more streams supported by one or more connections, etc. This information signal Cvol therefore represents the current volume of calls in progress within the local area network WLAN and is supplied to a management module MNGM adapted to compare the value of said signal to the predetermined thresholds Th1, Th2, Th3, . . . , ThN in the threshold register THREG. The management module MNGM is further adapted to activate any truncation module TCi associated with a threshold Thi that proves to be lower than the value of the information signal Cvol, which indicates that an overload of the local area network WLAN has occurred and must be dealt with by reducing the volume of the stream of data packets addressed to the local area network WLAN and adapting the format to render said packets less sensitive to possible transmission losses.

In this kind of situation, the management module MNGM sends a control signal Trk to a network filter NFLT to indicate that the input data packets Epi that said network filter NFLT is receiving from the Internet-type network INTNW must be sent to the management module MNGM rather than to the send/receive antenna system ANT, so that input data packets Epi may be truncated by the truncation means (TC1, TC2, TC3, . . . , TCN), which then send back to the network filter NFLT, via the management module MNGM, truncated hierarchical data packets Tepi that correspond to the packets Epi, which truncated packets Tepi are then sent to the local area network WLAN via the send/receive antenna system ANT instead of the original input packets Epi.

The embodiment of the invention described here can therefore reformat each data packet Epi in a preventative and non-discriminatory manner if an overload of the local area network WLAN is detected, since any data packet Epi in transit through the intermediate element is subject to truncation and hierarchical encoding in this kind of situation. This principle therefore ensures a certain continuity of service to all users of the local area network, since the hierarchical truncation effected in this way in principle favours at least one full transmission of each primary segment, even in the event of loss of one or more secondary segments because of the overload that has occurred.

In embodiments of the invention in which the encoding of the input data packets Dpi to form hierarchical packets Epi is optional, rather than systematic, in that it is intended only to be executed in the event of an overload of the local area network WLAN, the encoding means may be included in the management module MNGM itself and, for example, activated if the information signal Cvol has a value above a predetermined activation threshold. In such embodiments, the input data packets Dpi reach the network filter NFLT directly, which filter forwards them as such to the send/receive antenna system ANT if there is no overloading of the local area network WLAN. Alternatively, if an overload of the local area network WLAN occurs and is reported to the network filter NFLT by means of the control signal Trk, said network filter NFLT sends the input data packets Dpi to the management module MNGM, which hierarchically encodes said packets before transmitting them in the form of hierarchical packets Epi to the truncation means (TC1, TC2, TC3, . . . , TCN), in order for said hierarchical packets Epi to be truncated in the manner explained above.

Moreover, although this kind of embodiment is not shown here, it is perfectly feasible also to use the invention to reduce the volume of output data Dpo by organizing hierarchical truncation thereof via the management module MNGM before it is sent to the main network INTNW via the network filter NFLT.

The invention claimed is:

1. A telecommunications system including a local area network which is configured to communicate with a main network via an intermediate element through which data packets pass in transit from the local area network to the main network and through which data packets pass in transit from the main network to the local area network, the system comprising:
   means for evaluating a volume of calls in progress in the local area network and comprising a probe configured to capture the data packets in transit through the intermediate element and configured to generate an information signal having a value that conveys information representing a bandwidth consumed in the local area network at a corresponding moment in time
   a management module for comparing the value of said information signal to a predetermined threshold; and
   means for truncating the data packets in transit through the intermediate element, said truncation means being configured to be for activation by said management module if the value of said information signal is above said predetermined threshold and configured to reduce a size of said data packets, which are encoded as a primary data segment and a plurality of secondary data segments for attachment to the primary data segment, by deleting a secondary data segment.

2. The telecommunications system according to claim 1, wherein the truncation means include a plurality of truncation modules each dedicated to a particular kind of information to be conveyed by the data packets and each of said plural truncation modules being configured to be activated if the value of said information signal is above the predetermined threshold associated with a relevant truncation module.

3. The telecommunications system according to claim 2, wherein the intermediate element includes a channel for submitting requests to a third party which is configured to enable said intermediate element to request the third party to install another truncation module in addition to each said plural truncation modules which are already integrated into the truncation means.

4. The telecommunications system according to claim 3, wherein the value of the predetermined threshold associated with each said plural truncation modules is modified by download from the main network on said request channel.

5. The telecommunications system according to claim 1, wherein said management module is configured to generate a control signal for informing a network filter that the data packets being received by said network filter from the main network must be sent to said management module, so that those data packets are truncated by the truncation means.

6. Equipment forming an access point to a main network from a local area network, data packets being configured to pass in transit from the local area network to the main network through said access point, and configured to pass in transit from the main network to the local area network through said access point, the equipment comprising:
   means for evaluating a volume of calls in progress in the local area network and comprising a probe configured to capture the data packets in transit through the intermediate element and configured to generate an information signal having a value that conveys information representing bandwidth consumed in the local area network at a corresponding moment in time;
   a management module for comparing the value of said information signal to a predetermined threshold; and
   means for truncating the data packets in transit through the intermediate element, said truncation means being configured for activation by said management module if the value of the said information signal is above said predetermined threshold and configured to reduce a size of said data packets, which are encoded as a primary data segment and a plurality of secondary data segments for attachment to the primary data segment, by deleting a secondary data segment.

7. A telecommunications system including a local area network configured to communicate with a main network via an intermediate element through which data packets pass in transit from the local area network to the main area network and through which data packets pass in transit from the main network to the local area network, the system comprising:
   means for evaluating a volume of calls in progress in the local area network and comprising a probe configured to capture the data packets in transit through the intermediate element and configured to generate an information signal having a value that conveys information representing a bandwidth consumed in the local area network at a corresponding moment in time;
   a management module for comparing the value of said information signal to a predetermined threshold; and
   means for truncating the data packets in transit through the intermediate element, said truncation means including a plurality of truncation modules each dedicated to a particular kind of information to be conveyed by the data packets, each of said plural truncation modules being configured for activation if the value of said information signal is above the predetermined threshold associated with a relevant truncation module and said truncation means being configured for activation by said management module if the value of said information signal is above the predetermined threshold;
   wherein the intermediate element includes a channel for submitting requests to a third party and which is configured to enable said intermediate element to request the third party to install another truncation module in addition to truncation modules already integrated into the truncation means.

8. The telecommunications system according claim 7, wherein the value of the predetermined threshold associated with each truncation module is modified by download from the main network on said request channel.

* * * * *

UNITED STATES PATENT AND TRADEMARK OFFICE
CERTIFICATE OF CORRECTION

PATENT NO. : 7,693,184 B2  
APPLICATION NO. : 11/664912  
DATED : April 6, 2010  
INVENTOR(S) : Bertrand Mathieu et al.

Page 1 of 1

It is certified that error appears in the above-identified patent and that said Letters Patent is hereby corrected as shown below:

On the Title Page

Add the Foreign Application Priority Data as follows:

Item (30)    Foreign Application Priority Data

Oct. 7, 2004    (FR)    04 10582

Signed and Sealed this  
Fifth Day of February, 2013

Teresa Stanek Rea  
*Acting Director of the United States Patent and Trademark Office*